Patented Nov. 9, 1926.

1,606,254

UNITED STATES PATENT OFFICE.

WILHELM MERTE, OF WIESBADEN, GERMANY, ASSIGNOR TO THE FIRM KALLE & CO., AKTIENGESELLSCHAFT, OF BIEBRICH-ON-THE-RHINE, GERMANY.

SULPHUR DYE AND PROCESS OF MAKING SAME.

No Drawing. Application filed October 17, 1924, Serial No. 744,249, and in Germany August 12, 1922.

I have found that by melting di-hydroxy compounds of the aromatic series and aminocarbazoles with polysulphides, preferably under pressure, there are obtained sulphur dyestuffs of excellent fastness to chlorine and great tinctorial power, which are particularly suitable for dyeing cotton and give tints varying from blue to green to black.

By di-hydroxy compounds of the aromatic series I understand in the specification and claims either those of the benzene-naphthalene-anthracene-aceanthrene-or those of the carbazole series, furthermore the corresponding quinones, which, when fused with polysulphide, are converted into hydroquinones or the derivatives of these bodies.

By aminocarbazoles I understand not only these bodies themselves, but also the substitution products thereof and all other compounds being transformed into aminocarbazoles or their derivatives by means of an alkali metal polysulphide, as for instance nitrocarbazoles, nitrosocarbazoles, or nitronitrosocarbazoles.

The following examples illustrate my invention:

(1) There are introduced into a solution of sodium polysulphide, containing in 500 parts by volume 250 parts by weight of sulphur and 500 parts by weight of crystalline sodium sulphide and placed in an autoclave, provided with a stirrer, 44 parts by weight of hydroquinone and 84,8 parts by weight of 3-nitrocarbazole. This mixture is then heated for 4 hours to 150–160° C. The melt, thus obtained, is diluted with 1000 parts by volume of water and the dyestuff which separates is filtered off. It is washed with a 5% solution of common salt and dried and then advantageously boiled with hot alcohol or nitrobenzene, whereby any small quantity of a dyestuff less fast to washing is removed. The dyestuff, after being purified, yields a beautiful sulphur-black with a blue hue of great fastness to chlorine and an excellent fastness to light. If the melt is heated for about 8 hours to 145–150° and the further operations carried out as above indicated, a dyestuff is obtained in the form of a black powder which dyes cotton in a brownish-yellow vat, prepared with sodium sulphide, bluish-black tints of great fastness to chlorine.

(2) 43,2 parts by weight of benzoquinone are fused for about 4 hours at 150–160° under pressure with 84,8 parts by weight of 3-nitro carbazole and a solution of sodium polysulphide containing in 500 parts by volume 250 parts by weight of sulphur and 500 parts by weight of crystalline sodium sulphide, and the melt thus obtained is then worked up as usual. The dyestuff thus obtained gives on cotton a deep sulphur-black fast to chlorine.

If instead of benzoquinones, there are used quinones or quinoneimides of the naphthalene-anthracene-aceanthrene- or carbazole series, dyestuffs are obtained dyeing a black tint with a green hue or an olive-black tint.

(3) 72,8 parts by weight of 2-aminocarbazole and 22 parts by weight of hydroquinone are mixed with 700 parts by weight of a solution of sodium polysulphide, containing 500 parts by weight of sodium sulphide and 250 parts by weight of sulphur, and this mixture is introduced into an autoclave provided with a stirrer. The mixture is heated for about 4 hours to 150–160° C. and the melt obtained is worked up, after cooling, as indicated in example (1). The resulting dyestuff dyes cotton from the sodium sulphide- or hydrosulphite-vat a violet tint.

(4) Into 1050 parts by weight of a solution of sodium polysulphide, placed in an autoclave provided with a stirrer, are introduced 154,2 parts by weight of dinitrocarbazole and 66 parts by weight of hydroquinone, and the mixture is heated for 4 hours under pressure and while heating to 150–160° C. The operations for working up the product of the reaction are the same as those indicated in example (1). The resulting dyestuff gives on cotton from the sodium sulphide- or hydrosulphite-vat a black tint with a blue hue of great fastness to chlorine.

(5) 102,8 parts by weight of dinitrocarbazole and 88 parts by weight of hydroquinone are heated in an autoclave provided with a stirrer for 8 hours to 140–150° together with 1050 parts by weight of sodium polysulphide lye containing 375 parts by weight of sulphur and 750 parts by weight of crystalline sodium sulphide. The mass is worked up as above indicated. The dyestuff thus obtained dyes cotton from the sodium sulphide- or hydrosulphite-vat a black tint fast to chlorine.

The purification of the dyestuffs may be effected in the usual manner, preferably by extraction with amylalcohol and nitrobenzene.

I claim:

1. Process of producing sulphur dyes, consisting in fusing with alkali metal polysulphide para-dihydroxycompounds of the aromatic series and an aminocarbazole.

2. Process of producing sulphur dyes, consisting in fusing with alkali metal polysulphide para-dihydroxycompounds of the aromatic series and a carbazole containing a group capable of being transformed into an amino group by means of alkali metal polysulphide.

3. Process of producing sulphur dyes, consisting in fusing with alkali metal polysulphide a para-hydroquinone and an aminocarbazole.

4. As new products, sulphur dyes substantially identical with the product obtainable by fusing with alkali metal polysulphide para-dihydroxycompounds of the aromatic series and an aminocarbazole preferably under pressure, being black powders, soluble in concentrated sulphuric acid with a blue to green to black color, giving vats with the usual vat forming agents and coloring the fiber blue to green to black tints.

5. As new products, the sulphur dyes substantially identical with the products obtainable by fusing with alkali metal polysulphide a para-hydroquinone and an amino carbazole, preferably under pressure, being violet black powders, soluble in concentrated sulphuric acid with a bluish-green color, giving a brownish yellow vat with sodium sulphide or hydrosulphite coloring the fiber violet black.

In testimony whereof I hereunto affix my signature.

Dr. WILHELM MERTE.